May 10, 1932.  O. H. DICKE  1,857,531
FURNACE REGULATOR
Filed March 20, 1929
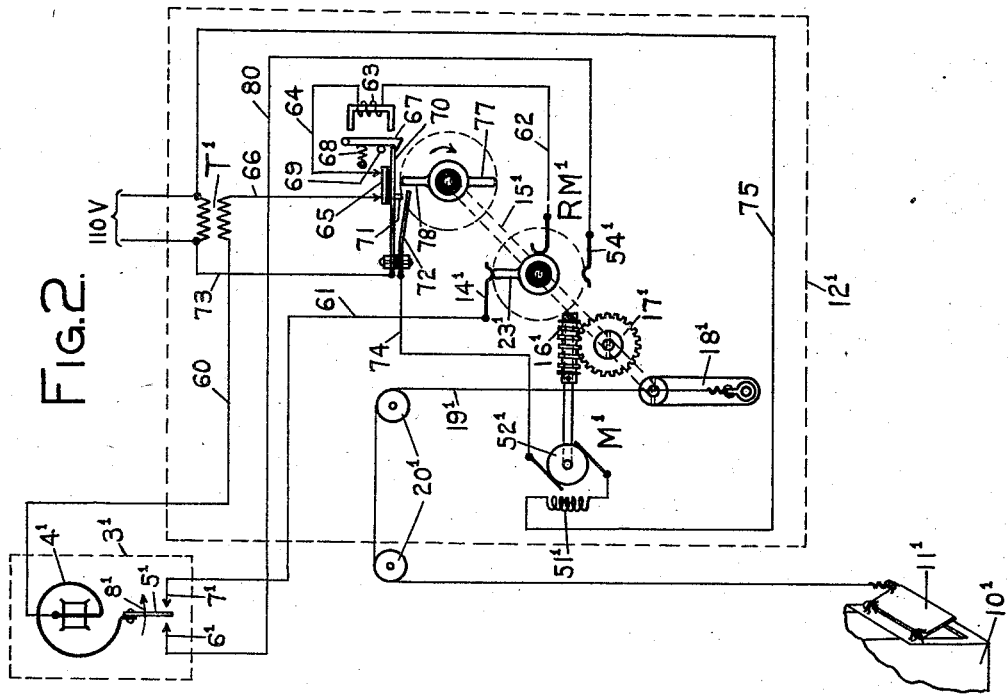
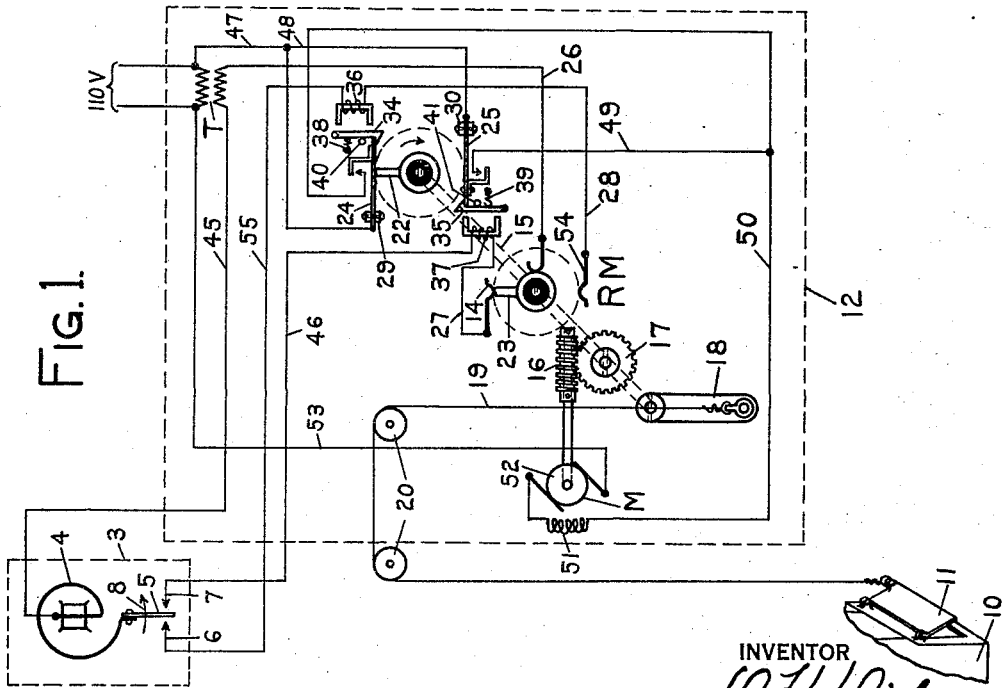
INVENTOR
O. H. Dicke Patented May 10, 1932

1,857,531

UNITED STATES PATENT OFFICE

OSCAR H. DICKE, OF ROCHESTER, NEW YORK, ASSIGNOR TO PIONEER HEAT REGULATOR CORPORATION, A CORPORATION OF NEW JERSEY

FURNACE REGULATOR

Application filed March 20, 1929. Serial No. 348,650.

The present invention relates to automatic furnace regulators, and more particularly to the regulating machine and its motive power cut-in and cut-out mechanism for operating dampers and fuel flow control devices.

In automatic furnace regulators the motive power mechanism is usually controlled by control contacts actuated by thermo-responsive means, and since such thermo-responsive means operates rather slowly the motive power mechanism is preferably controlled by such thermo-responsive means through the medium of an intermediary such as a relay. Dampers and fuel flow control devices are preferably operated through the medium of reciprocated means operated from a rotary crank so that one-half of the rotation of such crank closes the dampers or fuel flow devices and the other half rotation of such crank opens the dampers or fuel flow devices.

With the above and other important considerations in mind, it is proposed in accordance with the present invention to employ crank operated reciprocating means driven by an electric motor through the medium of reduction gearing, to control such motor by relay means constituting a spring actuated normally open contact reloadable through the medium of said motor and releasable by electro-responsive means controlled by a thermo-responsive contact.

In accordance with the preferred form of the invention it is proposed to so construct the above mentioned mechanism, that the relay means may be operated or loaded to its contact open position by the motor without actually breaking the motor circuit until after the reloading function has been entirely completed, whereby it is assured that if the spring actuated contact is released by such electro-responsive means such spring actuated contact may again assume its circuit closing position.

Other objects, purposes and characteristic features will be understood from the drawings and accompanying description.

In describing the invention in detail reference will be had to the accompanying drawings in which:

Fig. 1 illustrative conventionally one embodiment of the invention in which two strip coils are used for controlling the mechanism to its two positions; and, Fig. 2 shows the preferred form of the invention in which a single trip coil is used for controlling the mechanism to either of its two positions.

Referring to Fig. 1 of the drawings, a double throw thermal controlled contact mechanism, conveniently called a thermostat, is shown within the dotted rectangle 3, and comprises a spiral 4 of bi-metallic thermo-metal, a movable contact 5 and two stationary contacts 6 and 7. The bi-metallic metal is of such construction that an increase in temperature moves the contact in the direction of the arrow 8.

The reference character 10 denotes suitable heating means, such as a furnace, having a suitable heat control device 11 such as a gas or oil valve or a damper, which is controlled by said thermostat through the medium of the regulating machine RM confined within the dotted rectangle 12. In practicing the invention the thermostat is located in the apartment where the temperature is to be kept constant whereas the regulating machine is preferably located near the furnace as in the basement of the dwelling.

The regulating machine includes a main crank shaft 15 which is operated by a suitable motor M, through reduction gearing conventionally shown by worm 16 and worm wheel 17. This shaft 15 contains a crank 18, which through a chain or cable 19, passing over pulleys 20, opens and closes the damper 11. On this shaft 15 are contained two insulated cams or contactors 22 and 23, of which the cam 22 is used to restore the spring actuated contacts 24 and 25 to their normal latched position, and the cam 23 is used to connect the wire 26 to either of the wires 27 and 28. The contacts 24 and 25 are spring leaf contacts held by fixed supports 29 and 30, and are biased toward each other into contacting engagement with their stationary contacts indicated by arrows, of which the contact 24 is held open by the cam 22 and the contact 25 is held open by the latch 35. The latch 34 is also in position to prevent closure of contact 25 when the cam 22 is moved out of engagement with spring 24. The latch 34 is biased against the stop 40 by a spring 38 and the latch 35 is biased against the stop 41 by a spring 39. These spring contacts 24 and 25 may at proper times be caused to be operated to their abnormal position by electro-magnets 36 and 37, respectively. This mechanism RM, including the transformer T, is preferably mounted in a casing with the crank 18 projecting thereupon.

*Operation.*—Referring to Fig. 1, let us assume that the temperature of the apartment drops and the contact 5 in response thereto moves toward the left against its stationary contact 6, this does not produce any effect because the circuit in which contact 6 is contained is open at the contacts 23 and 54, this because the furnace damper 11 is already open.

Let us now assume with the damper 11 still open the room temperature rises and the contact 5 is operated toward the right and in the direction of the arrow 8 in response to this temperature change, this completes a circuit through the electro-magnet 37 as follows:—beginning at the secondary winding of transformer T, wire 45, thermostat metal 4, contacts 5—7, wire 46, winding of the electro-magnet 37, wire 27, contacts 14 and 23, wire 26, back to the transformer T. The completion of this circuit attracts the latch armature 35, pivoted at its lower end, thereby releasing the spring contact 25 biased to close and closing the following circuit through the motor M:—beginning at the 110V source, wires 47 and 48, spring contact 25, wires 49 and 50, field winding 51 and armature 52 of the motor M, wire 53, back to the 110V source. The completion of this circuit operates the motor to turn the main crank shaft 15 in a clock-wise direction, thereby breaking the circuit through the electro-magnet 37 at the contacts 14 and 23 and operating the damper 11 to its closed position. The motor is maintained in operation only through 180° movement of the crank 18, because after such movement the cam 22 restores the spring contact 25 to its latched position and again breaks the motor circuit at the contact 25. When this 180° movement of the shaft 15 is completed the contact 23 is in engagement with the stationary contact 54 thereby establishing a circuit for the electro-magnet 36, which may be completed upon movement of the thermostat contact 5 toward the left. It should be noted that with the main crank shaft 15 moved through an angle of 180° the cam 22 will assume its lower position and thereby free the spring contact 24 so that upon release of this contact by the latch 34 the motor circuit may be completed at the spring contact 24.

If now the temperature of the apartment drops slightly, the contact 5 will be moved to the left (the regulating machine now assuming the "closed damper" position) thereby completing the following circuit for the electro-magnet 36:—beginning at the secondary winding of transformer T, wire 45, thermostat metal 4, contacts 5—6, wire 55, winding of the electro-magnet 36, wire 28, contacts 54—23, wire 26, back to the transformer T. The completion of this circuit causes the latch armature 34 to be attracted, thereby releasing the spring contact 24 and completing the motor circuit heretofore traced except that now the spring contact 24 is substituted for the spring contact 25.

*Preferred form of the invention.*—In Fig. 2 has been shown a modified construction, which is considered to be the preferred form of the invention in that only one electro-magnet is required. In view of the fact that many of the elements are the same as those employed in Fig. 1 it is believed unnecessary to describe the structure separately, and it is believed that the invention may be best understood by considering the operation thereof and in pointing out structural differences therein, certain parts being given like reference characters as corresponding parts in Fig. 1 with distinctive exponents.

*Operation Fig. 2.*—Let us first assume that the temperature of the apartment drops and that in response to this temperature change the thermostat contact $5^1$ is moved toward the left. This movement of contact $5^1$ does not complete a circuit because the circuit is open at the contact $23^1$—$54^1$, this being the case because the furnace is already open.

Let us now assume that the temperature of the apartment rises, and that the thermostat contact $5^1$ is moved toward the right, under which condition the following circuit is completed:—beginning at the transformer $T^1$, wire 60, thermostat metal $4^1$, contact $5^1$—$7^1$, wire 61, contacts $14^1$—$23^1$, wire 62, winding of the electro-magnet 63, wire 64, protective contact 65, wire 66 back to the transformer T. The completion of this circuit causes the latch 67 to be attracted against the tension of the spring 68 and away from the stop 69, thereby releasing the spring member 70 and permitting the projecting contact stud 71 to engage the stationary spring contact 72. With the contacts 71—72 closed the following circuit for the motor $M^1$ is completed:—beginning at the 110V source, wires 73, spring member 70, contacts 71—72 wire 74, armature $52^1$ and field winding $51^1$ of the motor M, wire 75 back to the 110V source. The completion of this circuit causes the motor to operate the crank shaft $15^1$ in the clockwise direction. As the main shaft $15^1$ nears the end of a 180° movement the lug 77 engages the contact 72, which already in engagement with contact 71, thereby causing the lug 77 to raise the contacts 72 and 71 and with them raise the spring member 70 to and above the normal latched position, from which it is noted that the normal circuit is not opened due to the restoration of the spring member 70. As soon as the lug 77, however, gets beyond the end of the spring contact 72 the spring 72 by its bias returns to its normal position, thereby breaking the circuit for the motor M¹.

From this it appears that the motor has broken its own circuit after the necessary energy for breaking that circuit has been supplied, and that the restoring lug 77 has assumed a non-interfering position, as is not the case in Fig. 1. In other words, although the motor is used for restoring contact 71 and 72 to their normal open, or loaded, position to break its own circuit, this is accomplished in a way so that upon release of the contact spring 72 by the cam 77, the contacts 71—72 are opened, and this does not occur until the parts are in such position that release of the latch 67 of the relay mechanism permits contacts 71—72 to again close. Also, the actual breaking energy of the motor circuit does not occur until the energy for effecting such breaking has been stored in the spring contact 72 and this process of storing energy requires the restoration of spring member 70 so that it is assured that the entire restoration operation is completed before the motor current is actually cut off. It is therefore noted that not only does the motor supply the energy for breaking its own circuit but it also supplies the energy for again making it, thus by the energy stored in restored spring member 70.

With the crank shaft 15¹ rotating 180° the contact 23¹ engages the contact 54¹. Also, with this shaft turned at 180° and the spring member 70 restored to its normal position the protective contact 65 is restored, and the damper 11¹ is closed. Under this condition of the apparatus with the damper 11¹ in the closed position, let us assume that the temperature of the apartment drops and the contact 5¹ is moved toward the left in engagement with the stationary contact 6¹. This completes the following circuit:—beginning at the transformer T¹, wire 60, thermostat metal 4¹, contacts 5¹—6¹, wire 80, contact 54¹—23¹, wire 62, winding of the electromagnet 63, wire 64, protective contact 65, wire 66 back to the secondary winding transformer T¹. Completion of this circuit again trips the latch armature 67, thereby opening protective contact 65 and closing contacts 71—72 and causing operation of the motor M¹ to return the apparatus back to the normal "furnace-open" position. It should be noted that each time spring contact mechanism 70—71—72 is tripped that the protective contact 65 is immediately broken. This is done so as to assure that no arcing shall occur at the thermostat contacts 5¹—6¹—7¹ it being understood that the instant the tripping circuit is completed through the thermostat contacts the latch 67 is attracted and the protective contact 65 is opened. Also, it should be noted that the contacts 71—72 are not only quick-make but also will quick-break so as to limit arcing to a minimum.

In addition to the various advantages of the present invention already pointed out, it may be stated that it is highly desirable to employ relay means which is restored by the motor in a manner to store energy therein for again reclosing the motor circuit, and is tripped by a comparatively small electromagnet, the principal work being done by the motor itself and the control being carried out through the medium of such small electro-magnet. Another feature of the invention resides in the construction whereby the same contacts and relay mechanism may be used for operating the regulating machine from either extreme position to the other extreme position, this construction being such that the mechanical restoring mechanism operated by the motor is one which may be said to be self-clearing in that the motor breaks its own circuit only after the apparatus has already been relatched.

Having thus shown and described two embodiments of the present invention and having shown several rather specific circuit arrangements for carrying out the invention, it is desired to be understood that the devices and circuits selected have been selected for the purpose of facilitating illustration and description of the invention and have not been resorted to with the intent of disclosing the scope of the invention or the exact construction preferably employed in practicing the same, and that various changes, modifications, and additions may be made for carrying out the invention without departing from the spirit or scope thereof or the idea of means underlying the same, except as demanded by the scope of the following claims.

What I claim is:—

1. In a temperature regulating device, the combination with a shaft, of a crank on said shaft, heat control means operated by said crank, a motor for driving said shaft, a relay for controlling said motor which if operated to its active condition applies current to said motor, said relay including two spring fingers biased toward each other and holding means for holding one finger away from the other finger, and means operated by said motor for moving both of said fingers in a position so that said one finger may be held by said holding means and then disengaging said other finger and allowing it to be operated quickly to its biased normal position where it is out of engagement with said one finger.

2. In a system of temperature control in which the heat flow control devices are operated in response to the application of potential to one or the other of two stationary contacts by a movable thermal controlled contact, of a crank for controlling a heat flow control device, a motor driving said crank, biased contacts in said motor circuit biased to the closed position, latch means for holding one of said biased contacts in a position not to contact with the other biased contact, and an electro-magnet connected to one of said stationary contacts for releasing said latch.

3. In a system of temperature control in which the heat flow control devices are operated in response to the application of potential to one or the other of two stationary contacts by a movable thermal controlled contact, of a crank for controlling a heat flow control device, a motor driving said crank, biased contacts in said motor circuit biased to the closed position, latch means for holding one of said biased contacts in a position not to contact with the other biased contact, means operated by said motor for moving both of said biased contacts while in contacting relationship to a position where said one contact may be engaged by said latch and then quickly releasing both of said contacts whereby said one contact is held in its latched position and the other contact is freed to open said motor circuit, and an electro-magnet for releasing said latch at times connected to one and at times connected to the other of said stationary contacts.

4. A regulating machine for operating furnace dampers comprising, a motor for operating a damper, contacts biased toward each other for controlling the flow of current to said motor, a latch for holding one of said contacts away from the other contact, means operated by said motor for moving said contacts when in contacting relationship to a position where said one contact may be engaged by said latch and then releasing said contacts thus opening said motor circuit, and an electro-magnet for releasing said latch.

5. In a temperature regulating device, the combination with a shaft, heat control means operated by said shaft, a motor for driving said shaft, a relay for controlling said motor which if operated to its active condition applies current to said motor, said relay including two spring fingers biased toward each other and holding means for holding one finger away from the other finger, and means operated by said motor for moving both of said fingers in a position so that said one finger may be held by said holding means and then disengaging said other finger and allowing it to be operated quickly to its biased normal position where it is out of engagement with said one finger.

6. In a system of temperature control in which the heat flow control devices are operated in response to the application of potential to one or the other of two stationary contacts by a movable thermal controlled contact, the combination with a shaft for controlling the heat flow control device, of a motor driving said shaft, biased contacts in said motor circuit biased to the closed position, latch means for holding one of said biased contacts in a position not to contact with the other biased contact, and an electro-magnet connected to one of said stationary contacts for releasing said latch.

7. In a system of temperature control in which the heat flow control devices are operated in response to the application of potential to one or the other of two stationary contacts by a movable thermal controlled contact, the combination with a shaft for controlling the heat flow control device of a motor driving said shaft, biased contacts in said motor circuit biased to the closed position, latch means for holding one of said biased contacts in a position not to contact with the other biased contact, means operated by said motor for moving both of said biased contacts while in contacting relationship to a position where said one contact may be engaged by said latch and then quickly releasing both of said contacts whereby said one contact is held in its latched position and the other contact is freed to open said motor circuit, and an electro-magnet for releasing said latch at times connected to one and at times connected to the other of said stationary contacts.

8. In a temperature regulating system, an electric motor for operating suitable heat control means, a relay having a normally open contact biased to the closed position and normally maintained open which if closed will remain closed until said motor has operated through a predetermined cycle, electrically operated means for allowing closure of said contact, and a circuit for said motor including said normally open contact.

9. In a temperature regulating system, an electric motor for operating suitable heat control means, a circuit for controlling said motor, a normally open contact in said circuit biased to tend to assume the closed position, control means responsive to a momentary flow of current to allow closure of said contact, said control means maintaining said contact closed if once closed until said motor has operated through a predetermined cycle, and thermal responsive means for controlling said control means.

10. In a heat regulating system, the combination with a furnace regulating machine having a plurality of control circuits and which will operate until it assumes a position where the energized control circuit is broken by a switch within the regulating machine, said switch comprising contact members biased toward each other and biased toward a normal position, an abutment for holding one of said contact members out of contact with the other, and an electro-magnet in the energized control circuit for withdrawing said abutment and thereby engaging said contact members, and a thermostat for energizing any one of said control circuits but only one at a time.

11. In a heat regulating system, the combination with a furnace regulating machine having a plurality of control circuits and which will operate until it assumes a position where the energized control circuit is broken by a switch within the regulating machine, said switch comprising contact members biased toward each other and biased toward a normal position, an abutment for holding one of said contact members out of contact with the other, and an electro-magnet in the energized control circuit for withdrawing said abutment and thereby engaging said contact members.

12. In a heat regulating system, the combination with a furnace regulating machine having a plurality of control circuits and which will operate until it assumes a position where the energized control circuit is broken by a switch within the regulating machine, said switch comprising contact members biased toward each other and biased toward a normal position, an abutment for holding one of said contact members out of contact with the other, and electro-magnet in the energized control circuit for withdrawing said abutment and thereby engaging said contact members, and means for opening said circuit by snap action comprising a member actuated by said machine for moving said contact members to a position where one of them is located behind said abutment so that upon withdrawal of said restoring member the abutment will support one of said contact members allowing the other contact member to move away and opening the circuit.

In testimony whereof I affix my signature.

OSCAR H. DICKE.

CERTIFICATE OF CORRECTION.

Patent No. 1,857,531.                                                                   May 10, 1932.

OSCAR H. DICKE.

It is hereby certified that error appears in the printed specification of the above numbered patent requiring correction as follows: Page 1, line 50, for "illustrative" read illustrates and line 51, for "strip" read trip; page 2, line 127, after "which" insert the word is; page 5, line 32, claim 12, for "and" read an; and that the said Letters Patent should be read with these corrections therein that the same may conform to the record of the case in the Patent Office.

Signed and sealed this 30th day of August, A. D. 1932.

M. J. Moore, (Seal)                                                   Acting Commissioner of Patents.